United States Patent [19]

Hayden et al.

[11] 4,119,842

[45] Oct. 10, 1978

[54] HEATER CONTROL SYSTEM FOR LIQUID CRYSTAL DEVICE

[75] Inventors: Daniel B. Hayden, Port Huron; George W. Smith; Michael Kaplit, both of Birmingham, all of Mich.

[73] Assignee: General Motors Corporation, Detroit, Mich.

[21] Appl. No.: 807,376

[22] Filed: Jun. 17, 1977

[51] Int. Cl.² .............................................. G01J 1/20
[52] U.S. Cl. .................................... 250/201; 350/331; 350/351
[58] Field of Search ...................... 350/160 P, 160 LC; 250/201, 205

[56] References Cited

U.S. PATENT DOCUMENTS

| 2,792,484 | 5/1957 | Gurewitsch | 350/160 P |
| 4,029,393 | 6/1977 | Dungan | 350/160 LC |

*Primary Examiner*—M. Tokar
*Attorney, Agent, or Firm*—Warren D. Hill

[57] ABSTRACT

A twisted nematic liquid crystal device contains a liquid crystal material having dielectric anisotropy $\Delta\epsilon$ which is positive for certain values of temperature and frequency of an electrical signal applied across the material and negative for other values of these parameters. The device includes a heater and a test area (separate from the display area of the device) at which transmittance of light is monitored by a heater control circuit. A test frequency chosen to give $\Delta\epsilon \approx 0$ at the minimum desired operation temperature of the device is applied across the test area and the light transmittance is monitored to assure that the temperature is high enough. When the temperature is too low, the heater element is automatically energized to increase the temperature of the liquid crystal device.

6 Claims, 3 Drawing Figures

HEATER CONTROL SYSTEM FOR LIQUID CRYSTAL DEVICE

This invention relates to liquid crystal devices and especially to a heater control system therefore.

Liquid crystal devices used for example in displays are generally constructed of materials having a limited operating temperature range. Where it is desired to utilize the liquid crystal display in an environment subject to wide temperature variations such as in an automobile display panel, it is desirable to regulate the temperature of the device to assure that it attains an operable temperature. Generally, as a matter of design and material selection, the device can be so constructed that it will operate within the high temperature ranges found within an automobile; but if so it may be inoperative at the extremely low temperature sometimes encountered in the automobile.

It has previously been proposed to provide heaters for the liquid crystal devices to increase their temperature when the ambient temperature is lower than a desirable value. Controls for operating such heating arrangements, however, have generally been based upon some parameter indirectly related to the liquid crystal function, that is, the ambient temperature may be measured and the temperature of the liquid crystal device surmised from that so the heater is energized when the ambient temperature is low. If, however, the device is heated locally, the ambient temperature does not accurately reflect the device temperature. It is also possible to measure the temperature of the device per se, however, this is not readily accomplished in an economical manner and still is an indirect measurement since the ultimate function of the liquid crystal device is light transmission. It is herein proposed to use light transmission as the control parameter thereby affording a truly direct measure of the need for energizing the heater.

It is therefore an object of this invention to provide a heater control for a liquid crystal device wherein the control is based on the response of the light transmission capability of the device to an applied test signal.

The light transmission state of a liquid crystal device depends upon the electrical field applied across the device. For a material with a dielectric anisotropy which is positive at low frequency and at normal operating temperatures, a field alternating at a low frequency can turn the device on or off according to whether the field is applied or removed. Alternatively, if the sign of $\Delta\epsilon$ is frequency dependent, the device may be turned on or off by selectively applying fields of low frequency and high frequency. The maximum value of the low frequency range effective to control the operation of the liquid crystal device is dependent upon temperature and increases with temperature.

The invention is carried out in a liquid crystal device incorporating a heating element by providing a test frequency higher than the low frequency signal which is to be used in controlling the device, (the test frequency being operative to control the light transmission in the desired temperature range) an arrangement for detecting the light transmission state of the device when the test signal is applied, and a control circuit which responds to the light transmission state to energize the heater when the light transmission state indicates that the device is below a desired operating temperature.

The above and other advantages will be made more apparent from the following specification taken in conjunction with the accompanying drawings wherein like reference numerals refer to like parts and wherein.

Figure 1:
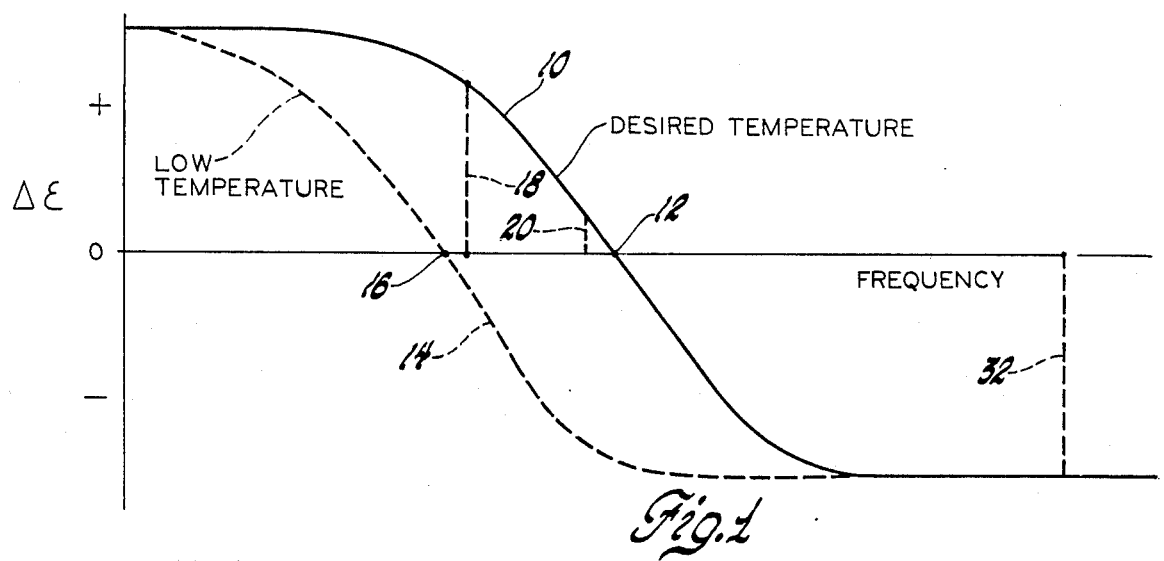
FIG. 1 is a graph illustrating the variation of dielectric anisotropy of a liquid crystal material with frequency and temperature.

A liquid crystal device includes a thin film of liquid crystal material between two plates spaced by a small gap. The liquid crystal materials often have dielectric anisotropy $\Delta\epsilon$ which changes sign with a change in frequency. The dielectric constant $\epsilon_\parallel$ of the liquid crystal material measured in a direction parallel to the preferred direction of the molecules less the dielectric constant $\epsilon_\perp$ measured perpendicular to that direction is the dielectric anisotropy $\Delta\epsilon$. The crossover frequency at which $\Delta\epsilon$ changes sign increases with temperature according to the equation $f = $ constant $\times \exp(-E/RT)$, where $E$ is an activation energy, $R$ is the gas constant and $T$ is the absolute temperature. The frequency and temperature dependence of $\Delta\epsilon$ are shown in FIG. 1. The solid curve 10 represents the $\Delta\epsilon$ of the material at a desired temperature of operation with the crossover frequency occurring at a frequency 12. Applied fields of frequency less than the frequency 12 operate in the range of positive dielectric anisotropy and accordingly are effective to align the liquid crystal molecules parallel to the applied field. At frequencies greater than the crossover frequency 12 an applied signal will align the molecules perpendicular to the field direction. Thus, for a twisted nematic device, switching from a low to a high frequency field or switching from a low frequency field to no field changes the device from one light transmission state to the other.

The broken line curve 14 represents that obtained at a temperature below the desired temperature. The crossover frequency then occurs at a frequency 16 lower than that which occurred at the desired temperature. Accordingly there is a frequency range higher than the crossover frequency 16 at which the device is operable at the desired temperature but would be inoperable at the lower temperature corresponding to the curve 14.

If then a liquid crystal device is designed to operate at a given frequency, it is necessary to assure that the temperature of the device is sufficiently high to allow operation at that frequency. For effective functioning of a liquid crystal device, it is not only necessary that the device turn on in a range of positive dielectric anisotropy but it is further desired that the value of dielectric anisotropy be relatively large. For example, if the desired operating frequency is at frequency 18, as shown in FIG. 1, the value of positive dielectric anisotropy will be large if the device is operating at the desired temperature represented by the curve 10.

In accordance with this invention, the desired temperature is attained by applying a test signal at a frequency 20 somewhat higher than the desired frequency 18 and monitoring the light transmission state of the device during application of the test frequency 20 to determine whether the device is responsive at that frequency. If not, it is an indication that the device is at a low temperature and the heater is activated to warm the device until the desired temperature is reached, at which time the response of the device to the test frequency 20 will indicate that the appropriate temperature has been reached.

Figure 2:
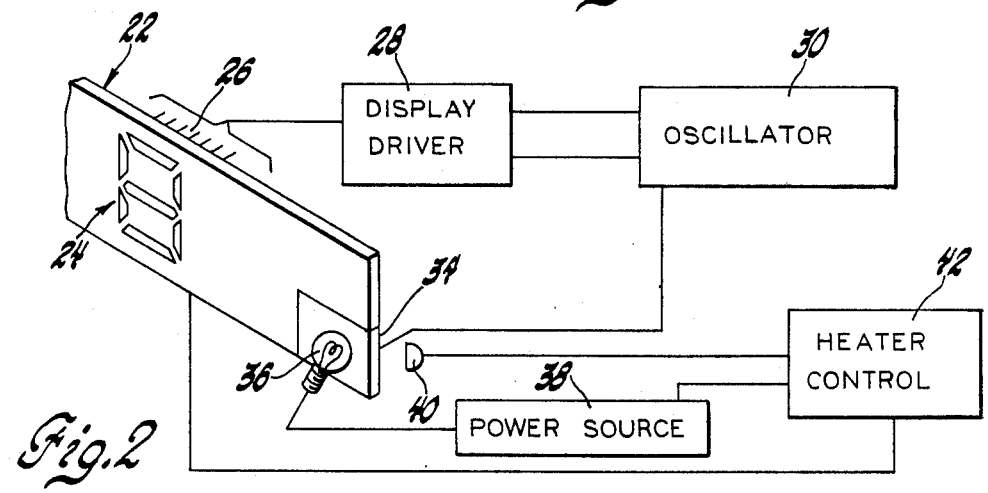
FIG. 2 is a schematic illustration of a liquid crystal device combined with a block diagram of a control circuit for the device.

In FIG. 2 a portion of a display device 22 includes a representative seven-segment display character 24 having the individual segments connected by leads 26 to a display driver 28 which selectively connects the segments to an oscillator 30 which is a source of both high frequency and low frequency signals. When a low frequency signal is applied to a device at operating temperature, the display segment is switched to one state and when the high frequency signal is applied, the segment is switched to the other state of light transmission. With reference to FIG. 1, the low frequency corresponds to the frequency 18 and the high frequency corresponds to the frequency 32 which is selected to assure that the device can be driven to a condition of negative dielectric anisotropy thereby assuring that the display device changes state rapidly when that frequency is applied. One corner 34 of liquid crystal display panel 22 is reserved as a test area. The oscillator 30 continuously supplies to the test area a test signal having a frequency 20 intermediate to the low frequency 18 of the operating signal and the crossover frequency 12. A lamp 36 or other light source is positioned on one side of the test area and is actuated by a power source 38. A photosensitive element 40 at the other side of the test area is connected to a heater control circuit 42. The heater control circuit 42 serves to apply electrical current to a heating element integrated in the display panel 22.

Figure 3:
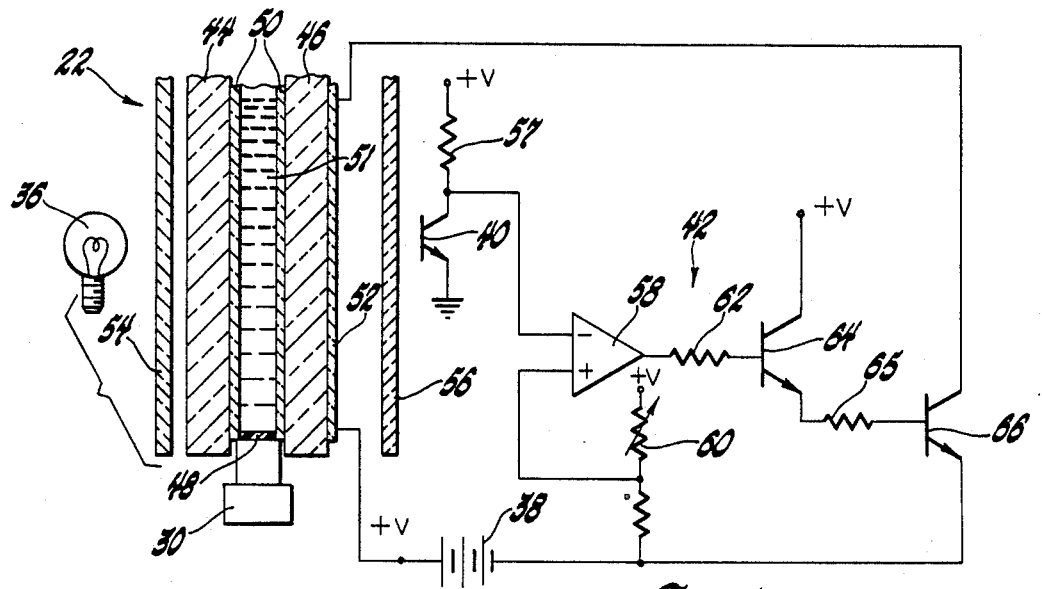
FIG. 3 is a diagrammatic cross-sectional view of the device of FIG. 2 and a schematic heater control circuit according to the invention.

FIG. 3 illustrates in cross section the test area of the display device 22 and the circuitry of the heater control 42. A liquid crystal display 22 includes a pair of spaced glass plates 44 and 46 separated by an insulating spacer 48 around the periphery of the display device. The inner surface of each glass plate is coated with a transparent electrode 50. As is well known in the manufacture of twisted nematic crystal devices, the exposed surfaces of the electrodes are rubbed in mutually perpendicular directions (or otherwise treated) to accomplish the twisted molecular alignment within the liquid crystal material 51 contained between the electrodes. A preferred composition of the liquid crystal material is given in the accompanying table.

| Mole Fraction | Ingredient |
|---|---|
| 0.78 | 4-n-pentylphenyl-2-chloro-4-(4-n-pentylbenzoyloxy)-benzoate |
| 0.11 | p-pentylphenyl-p-propylbenzoate |
| 0.04 | p-cyanophenyl-p-butylbenzoate |
| 0.07 | p-cyanophenyl-p-heptylbenzoate |

This mixture has a nematic phase over a temperature range of 10° to 100° C. The dielectric anisotropy varies with frequency according to the following table for a temperature of 20.5° C.:

| Frequency (KHz) | Δ E |
|---|---|
| 0.1 | +4.0 |
| 0.5 | +3.65 |
| 1.0 | +2.35 |
| 2.0 | +0.45 |
| 3.0 | −0.6 |
| 5.0 | −1.35 |
| 7.0 | −1.65 |
| 10 | −1.9 |
| 30 | −2.3 |

For this specific device then appropriate operating frequencies are 0.1 kHz for the low control frequency 18, 30 kHz for the high control frequency 32 (if used) and 2 kHz for the test frequency 20.

A transparent film 52 of tin oxide, for example, on one surface of the glass plate 46 comprises a resistance heater for heating the liquid crystal device when the heater is energized by passing electrical current therethrough. Other heater arrangements are known and may be employed. Specific examples are shown in the United States patent application Ser. No. 765,548 entitled "Symmetrical Internal Heater for Liquid Crystal Display" filed on Feb. 7, 1977 by Kaplit, Hayden and Smith. A polarizer 54 is positioned adjacent the plate 44 and an analyzer 56 is positioned adjacent the plate 46. Preferably the lamp 36 and the photodetector 40 are adjacent the polarizer 54 and analyzer 56 respectively.

In operation the nature of the twisted nematic cell is such that when no voltage is applied or a high frequency signal is applied to the electrodes, the orientation of the molecules in the liquid crystal material causes a 90° rotation of the direction of light polarization. When the polarization directions of the polarizer and analyzer are perpendicular, light will pass from the source 36 to the photodetector 40 under that no voltage (or high frequency) condition of the device. When, however, a low frequency field (below the crossover frequency) is applied to the electrodes of the device, the orientation of the molecules is changed such that rotation of the polarized light does not occur. In that condition then, light from the source 36 is blocked from reaching the photodetector 40. When the temperature is so low that the liquid crystal material freezes to form a crystalline solid, light will be passed to the photodetector due to scattering and birefringence by the solid. Even if the liquid crystal forms a glassy phase which preserves the liquid crystalline alignment, the light will be passed. Thus whenever light is sensed by the photodetector, the device is too cold for proper response to the control signal.

The photodetector 40 comprises a phototransistor which when it senses light, conducts a photocurrent dependent on the light intensity. The phototransistor 40 has a grounded emitter and its collector is connected through a resistor 57 to the voltage source +V. The collector is also connected to the negative input of an operational amplifier comparator 58, the positive input terminal of which is connected to a potentiometer 60 which imposes a reference voltage on the comparator 58. Thus the voltage drop across the resistor 57 due to the photo current is compared to the reference voltage. The comparator output is connected through a resistor 62 to the base of a transistor 64 having its collector connected to positive voltage and its emitter connected through a resistor 65 to the base of a second transistor 66 which has its emitter and collector connected in series with the battery or power source 38 and the resistance heater 52. Thus when the liquid crystal device is cold, say at the temperature corresponding to the curve 14 in FIG. 1, and the test frequency 20 is applied, that signal is unable to change the light transmission state of the device since it is in the negative dielectric anisotropy range. Accordingly, light will pass from the source 36 to the phototransistor 40. The resulting low voltage at the phototransistor collector causes a positive voltage output from the comparator to turn on transistors 64 and 66 thereby switching on current to the heater 52. When the device temperature reaches a point represented by the solid line 10 of FIG. 1, at which the dielectric anisotropy for the frequency of the test signal 20 is positive, the light transmision will decrease to a point at which the potential from the collector of phototransistor 40 is greater than the reference voltage so that the comparator 58 produces a negative output and the transistors 64 and 66 are turned off, thereby terminating the heating of the liquid crystal device.

Since the heat is applied to the entire liquid crystal device, i.e. the display area as well as the test area, the entire device will be uniformly heated. Thus by the time the temperature reaches the desired temperature corresponding to curve 10 of FIG. 1, the frequency 18 utilized by the control signal will occur at a region of positive dielectric anisotropy of large value so that the device is efficiently operated. The high frequency portion of the control signal 32 remains at a negative dielectric anisotropy region so that it will be effective to assist in changing the light transmission state if it is applied when the low frequency signal is terminated. In the event cooling takes place after the heater 52 has been turned off, the resulting shift of the crossover frequency toward the test frequency 20 will cause an increase of light transmission to the phototransistor 40 to turn on the heater 52 again. This assures that the low frequency control signal 18 remains in a region of high positive dielectric anisotropy so that the display will be operative and the cycling of the heater will not have a noticeable effect on the display operation.

The invention of course is not limited to the specific examples described herein. For example the same principle applies if a parallel polarizer-analyzer pair is employed, although the light transmission states will be reversed and the detector circuit must be suitably altered to accomodate that change.

It will thus be seen that the invention described herein allows the direct sensing of light transmission for use as the control parameter for heating of a nematic liquid crystal device.

The embodiments of the invention in which an exclusive property or privilege is claimed are defined as follows:

1. A heater control system for a liquid crystal device of a type having a light transmission state dependent on the frequency of an electrical control signal applied thereto, the device having a first light transmission state when an electrical signal having a frequency below a crossover frequency is applied to the device, and otherwise having a second light transmission state, said crossover frequency increasing as the temperature of said device increases, and said device having a predetermined desired crossover frequency when the temperature of the device has a predetermined value, means for heating the device, means for applying to the device a test signal of a predetermined frequency less than said desired crossover frequency by a slight amount, means for detecting the light transmission state of said device when said test signal of said predetermined frequency is applied thereto, and a control circuit responsive to the light transmission state of the device for energizing the heating means when the detected light transmission state is indicative of a temperature of said device that is below the value that corresponds to said desired crossover frequency, thus assuring that said device will attain a temperature sufficient to respond to an applied control signal of frequency no greater than the frequency of the test signal.

2. A heater control system for a liquid crystal device of a type having a light transmission state dependent on the frequency of an electrical signal applied thereto, the device having a first light transmission state when an electrical signal having a frequency below a crossover frequency is applied to the device, a second light transmission state when the said electrical signal is not applied, and further having the second light transmission state when an electrical signal of frequency higher than the crossover frequency is applied to the device, the crossover frequency increasing as the temperature of said device increases, and said device having a predetermined desired crossover frequency at a predetermined desired temperature of the device, means for selectively applying to said device a control signal having a frequency much below the desired crossover frequency to thereby selectively control its light transmission state, means for heating the device, means for applying to the device a test signal of a frequency slightly less than said desired crossover frequency and greater than the control signal frequency, means for detecting the light transmission state of said device, and a control circuit responsive to the light transmission state of the device when said test signal is being applied thereto for energizing the heating means when the detected light transmission state indicates that the said device is below the said desired temperature that corresponds to said desired crossover frequency, thus assuring that said device will attain a temperature sufficient to respond to said control signal.

3. A heater control system for a liquid crystal device of a type having a light transmission state dependent on the frequency of an electrical signal applied thereto, the device having a first light transmission state when an electrical signal having a frequency below a crossover frequency is applied to the device, a second light transmission state when an electrical signal of frequency higher than the crossover frequency is applied to the device, the crossover frequency increasing as the temperature of said device increases, and said device having a predetermined desired crossover frequency at a predetermined desired temperature of the device, means for selectively applying to said device a control signal having alternatively a first frequency much below the desired crossover frequency and a second frequency above the desired crossover frequency to thereby selectively control its light transmission state, means for heating the device, means for applying to the device a test signal of a frequency slightly less than said desired crossover frequency and greater than the said first frequency, means for detecting the light transmission state of said device, and a control circuit responsive to the light transmission state of the device when said test signal is being applied thereto for energizing the heating means when the detected light transmission state indicates that the said device is below the said desired temperature that corresponds to said desired crossover frequency, thus assuring that said device will attain a temperature sufficient to respond to said first frequency of the control signal.

4. A heater control system for a liquid crystal display device of a type having a light transmission state dependent on the frequency of an electrical signal applied thereto, the device having a first light transmission state when an electrical signal having a frequency below a crossover frequency is applied to the device, and otherwise having a second light transmission state, the crossover frequency increasing as the temperature of said device increases, and said device having a predetermined desired crossover frequency at a predetermined desired temperature of the device, the device having a display area and a test area, means for selectively applying to the display area of said device a control signal having a frequency much below the desired crossover frequency to thereby selectively control its light transmission state, means for heating the device, means for applying to the test area of said device a test signal of a frequency slightly less than said desired crossover frequency and greater than the control signal frequency, means for detecting the light transmission state of the test area of said device, and a control circuit responsive to the detected light transmission state of the device when said test signal is being applied thereto for energizing the heating means when the detected light transmission state indicates that the said device is below the said desired temperature that corresponds to said desired crossover frequency, thus assuring that the display area of said device will be sufficiently warm to respond to said control signal.

5. A heater control system for a liquid crystal device of a type having a light transmission state dependent on the frequency of an electrical control signal applied thereto, the device having a first light transmission state when an electrical signal having a frequency below a crossover frequency is applied to the device, and otherwise having a second light transmission state, said crossover frequency increasing as the temperature of said device increases, and said device having a predetermined desired crossover frequency when the temperature of the device has a predetermined value, means for heating the device, means for applying to the device a test signal of a predetermined frequency less than said desired crossover frequency by a slight amount, means for detecting the light transmission state of said device when said test signal of said predetermined frequency is applied thereto including a light source on one side of the device and a photosensitive element on the other side of the device, and a control circuit connected to the photosensitive element responsive to the light transmission state of the device for energizing the heating means when the detected light transmission state is indicative of a temperature of said device that is below the value that corresponds to said desired crossover frequency, thus assuring that said device will attain a temperature sufficient to respond to an applied control signal of frequency no greater than the frequency of the test signal.

6. A heater control system for a liquid crystal device responsive to applied electrical signals to selectively permit and block light transmission respectively when the device is at a desired operating temperature, the device containing a liquid crystal material having a frequency and temperature varying dielectric anisotropy, the dielectric anisotropy being positive at a low frequency of applied signals to effect one state of light transmission and negative at a high frequency to effect another state of light transmission, the crossover frequency at which the dielectric anisotropy changes from positive to negative increasing as temperature increases,
  means for heating the device,
  means for applying to the device a test signal at a frequency intermediate the said low and high frequencies of the applied signals and corresponding to the crossover frequency at a desired operating temperature,
  means for detecting the light transmission state of the device, and
  a control circuit responsive to the light transmission state of the device upon application of the test signal for energizing the heating means when the detected light transmission state indicates that the liquid crystal material is in a negative dielectric anisotropic state to thereby raise the liquid crystal material to the selected normal operating temperature, whereupon the liquid crystal material assumes a positive dielectric anisotropy state at the frequency of the said test signal.

* * * * *